Oct. 21, 1941.  C. E. JOHNSON ET AL  2,259,567
ENCLOSED VARIABLE-SPEED DEVICE
Filed July 6, 1935  5 Sheets-Sheet 1

INVENTORS
CARL E. JOHNSON
EARL MENDENHALL
ATTORNEY.

Oct. 21, 1941.  C. E. JOHNSON ET AL  2,259,567
ENCLOSED VARIABLE-SPEED DEVICE
Filed July 6 1935  5 Sheets-Sheet 2
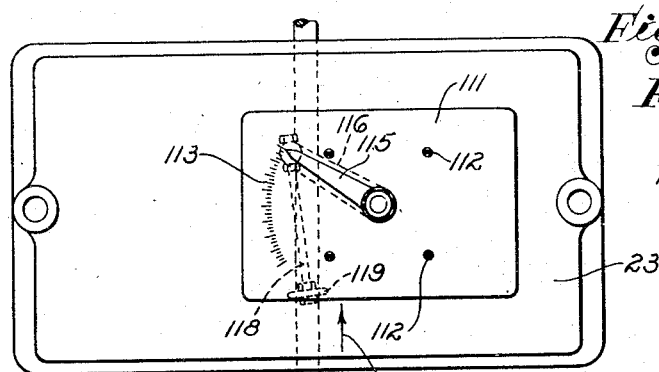
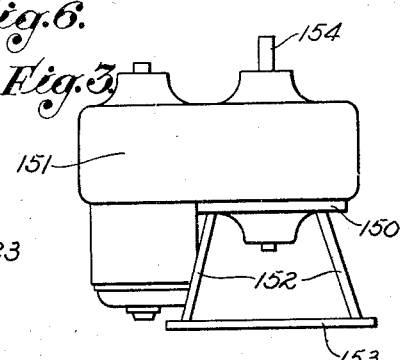
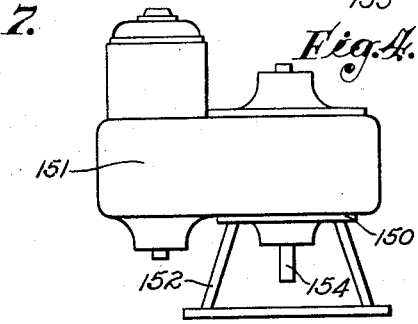
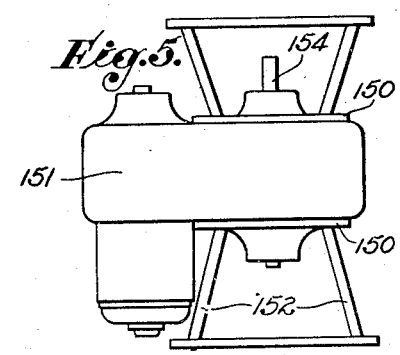
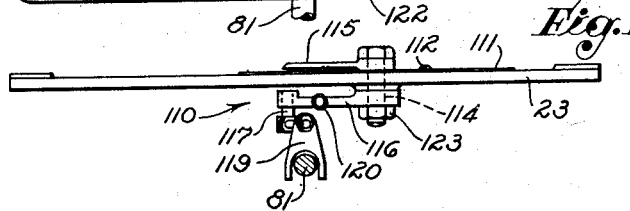
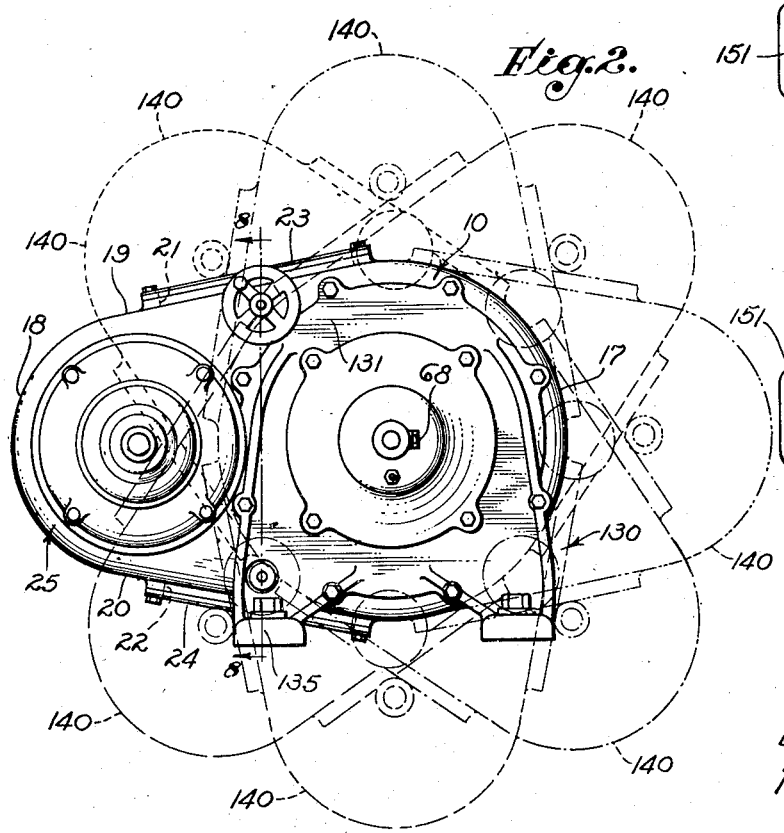
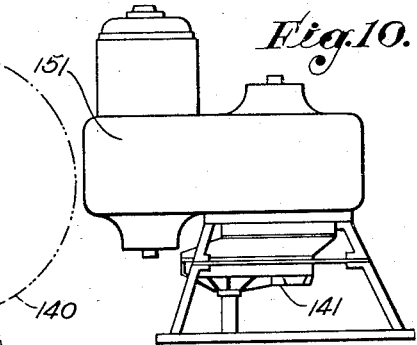
INVENTORS
CARL E. JOHNSON
EARL MENDENHALL
ATTORNEY.

Oct. 21, 1941.   C. E. JOHNSON ET AL   2,259,567
ENCLOSED VARIABLE-SPEED DEVICE
Filed July 6, 1935   5 Sheets-Sheet 3
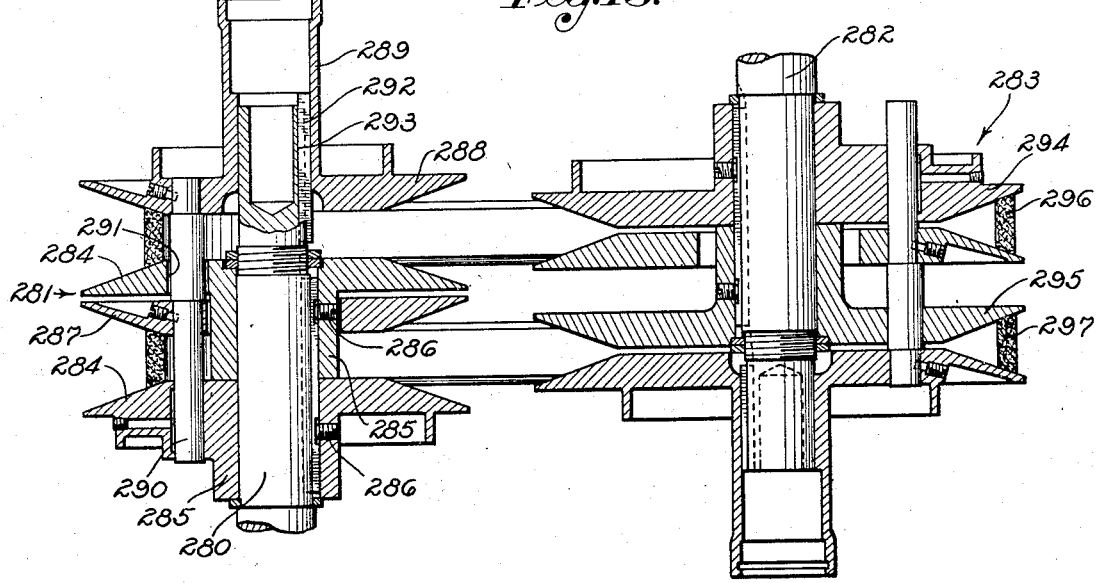
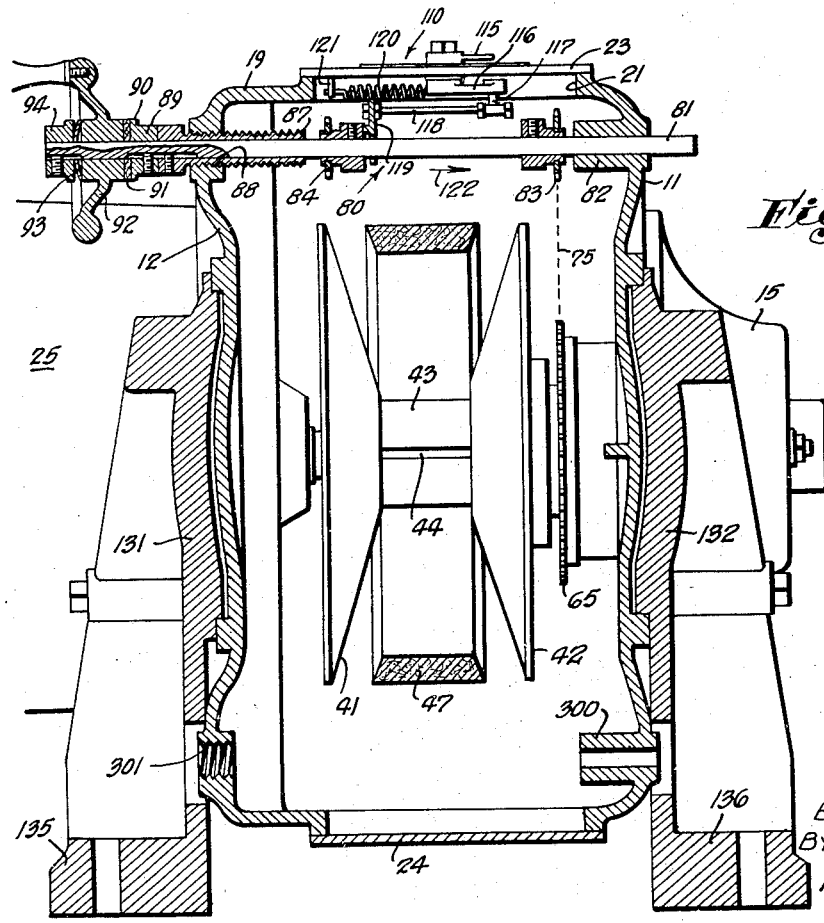
INVENTORS
CARL E. JOHNSON
EARL MENDENHALL
BY
ATTORNEY.

Oct. 21, 1941.  C. E. JOHNSON ET AL  2,259,567
ENCLOSED VARIABLE-SPEED DEVICE
Filed July 6, 1935  5 Sheets—Sheet 4
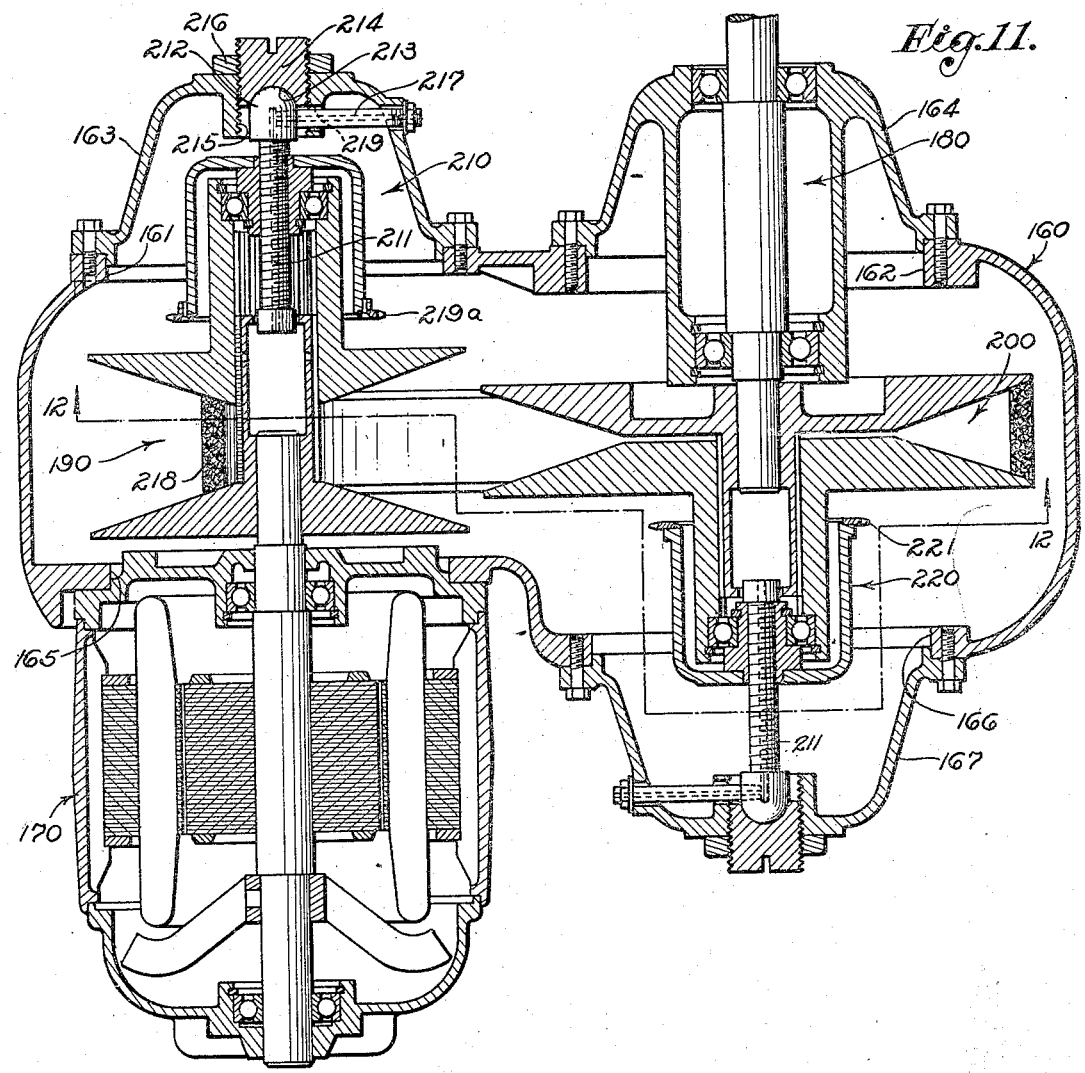
Fig. 11.
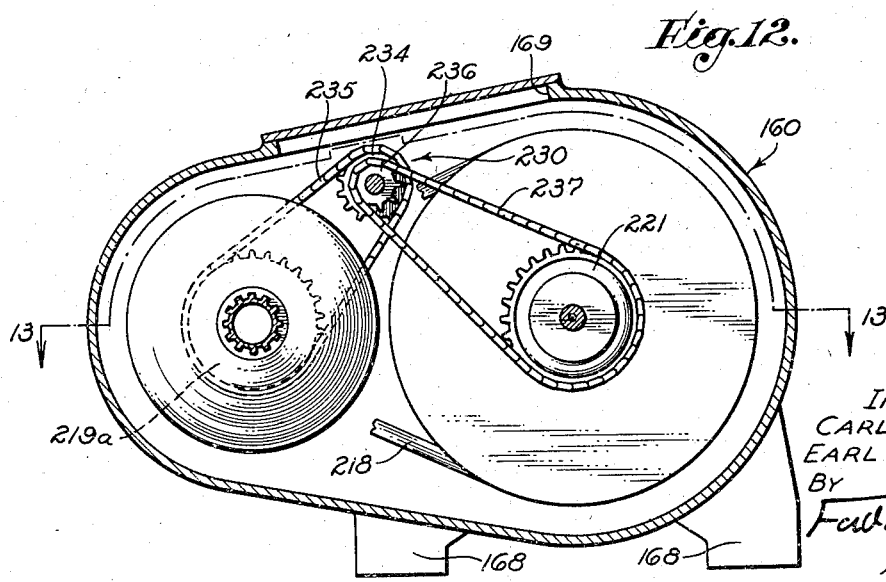
Fig. 12.
INVENTORS
CARL E. JOHNSON
EARL MENDENHALL
BY
ATTORNEY.

Oct. 21, 1941.  C. E. JOHNSON ET AL  2,259,567
ENCLOSED VARIABLE-SPEED DEVICE
Filed July 6, 1935  5 Sheets-Sheet 5
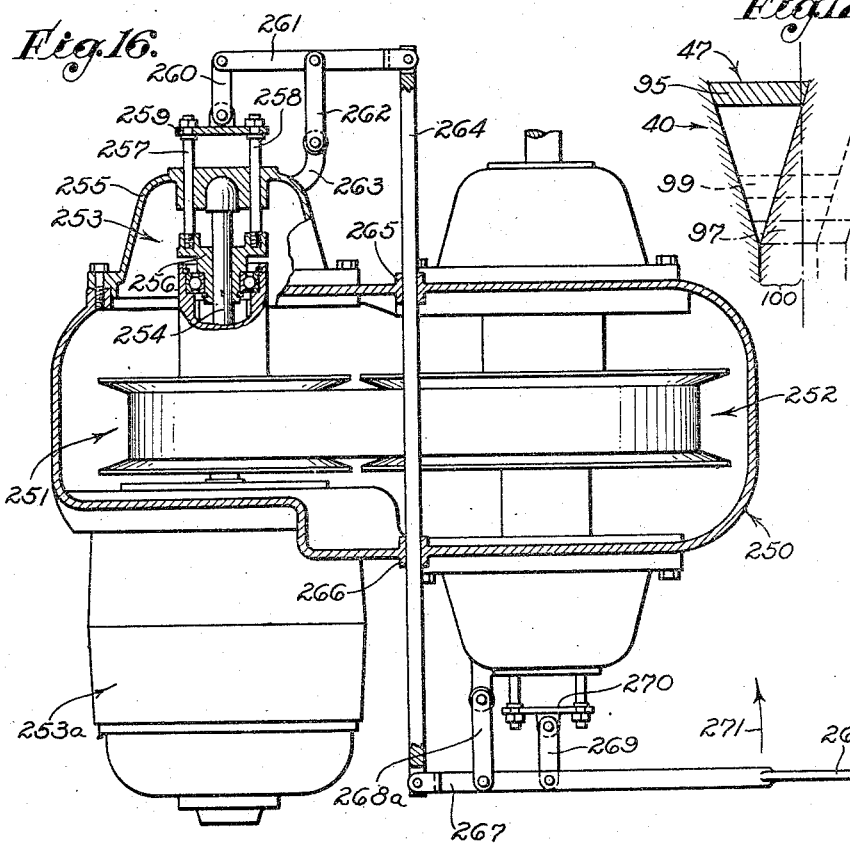
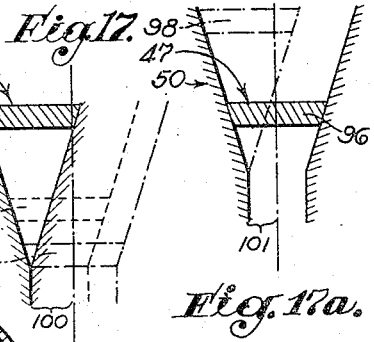
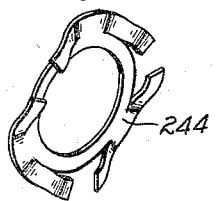
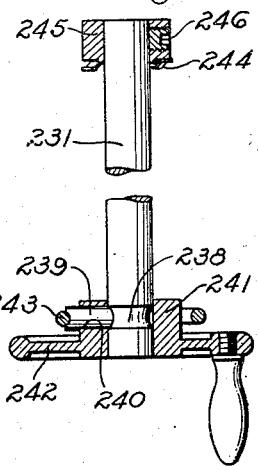
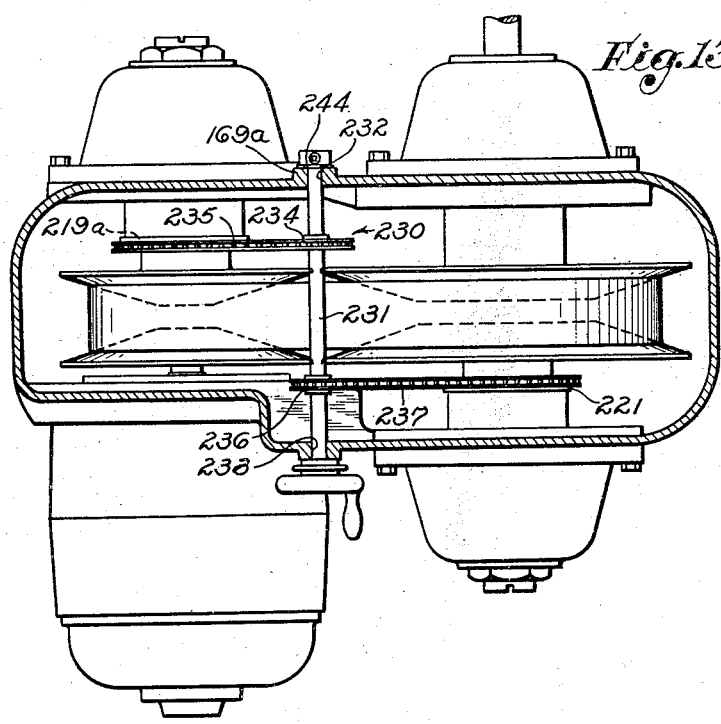
INVENTORS
CARL E. JOHNSON
EARL MENDENHALL
BY Fad W Lauri
ATTORNEY.

Patented Oct. 21, 1941

2,259,567

UNITED STATES PATENT OFFICE 2,259,567

ENCLOSED VARIABLE-SPEED DEVICE

Carl E. Johnson, Pasadena, and Earl Mendenhall, Los Angeles, Calif., assignors to Sterling Electric Motors, Inc., Los Angeles, Calif., a corporation of California Application July 6, 1935, Serial No. 30,112

11 Claims. (Cl. 74—230.17)

This application is a continuation-in-part of our application, Serial No. 677,863, entitled Variable-speed unit, filed June 27, 1933.

Our invention relates to the transmission art, and more particularly to a variable-speed transmission system utilizing one or more variable-diameter pulleys of the V-type.

In practice it has been found that the ordinary type of variable-speed transmission unit utilizing variable-diameter pulleys has a very limited range of convenient applications, due to the fact that it is built with two or more fixed legs which are adapted to be bolted to a supporting means. Such a unit is generally provided with legs so that it will normally be positioned with its housing substantially parallel to a horizontal supporting floor or platform, and if limited space requirements necessitate placing the housing in an upright or other position relative to the supporting means, additional brackets and auxiliary supports are required. Frequently a machine to be driven is placed a considerable distance from any support suitable for the ordinary transmission unit, so that a long drive belt must be used or an expensive support built, neither of which is satisfactory. It has been the custom in the trade to specially engineer each installation of such a variable-speed unit so as to provide adequate supporting means, and once such a unit is installed it is frequently inconvenient or impossible to change its use without extensive structural changes in the supporting means. It is a primary object of our invention to obviate these disadvantages by providing a supporting means for a variable-speed unit which can be readily adapted to support the unit in substantially any desired position relative to a machine to be driven.

It is a further object of our invention to provide an enclosed variable-speed unit having a housing, bearings mounted in the housing and adapted to journal and support a shaft having a variable-diameter pulley thereon, and an opening in the housing opposite the bearings and normally closed by a cover through which the shaft can be removed. By such a construction, all of the rotational stresses and strains of the pulley are carried directly by the housing through the supporting bearings, there being no strains on the opening cover, and consequently a stronger and more rigid construction is obtained. A further important advantage derived from this construction lies in the fact that the shaft may be removed through the opening in the housing without disturbing or dismantling the supporting bearing structure which is fixed in the housing opposite the opening.

Another object of our invention is to provide a variable-speed unit having two variable-diameter pulley adjustment means provided with thrust bearings which are substantially self-aligning, so as to insure correct and efficient operation of the device. We prefer to accomplish this by floating each of the adjustment means bearings on a ball and socket support which will permit them to self-align during operation.

In most variable-speed units using a resilient belt to connect two variable-diameter pulleys, belt stretch caused by wear is a serious difficulty, since in the ordinary unit the belt must be removed from the unit and shortened to compensate for the lengthening caused by wear. It is an object of our invention to provide mechanism in such a unit whereby belt stretch may be compensated for without removing the belt from the unit.

In the adjustment means of our invention, which is designed to vary the effective diameter of the variable-diameter pulley, bearings are provided, preferably of the ball-bearing type, which communicate the thrust of the adjustment means to the pulley flanges, and it is another object of our invention to provide an adjustable stop mechanism for preventing overloading of these bearings by the adjustment means.

In variable-diameter pulley units having a pair of flanges which are relatively axially movable to vary the effective diameter of the pulley, considerable difficulty is experienced in operation in the pulley flanges sticking or jamming, no suitable lubrication system for such a unit having been heretofore designed. Accordingly, it is another object of our invention to provide a lubrication system for a variable-diameter pulley which will insure that the pulley flanges may be moved axially during rotation of the pulley. To accomplish this, we prefer to provide a surplus oil or grease reservoir inside the shaft on which the pulley is carried, communicating with the exterior of the pulley housing so that lubricant can be forced into the reservoir during rotation of the pulley, and communicating with the sliding surfaces in the pulley mechanism so that the lubricant may be forced between such sliding surfaces by centrifugal force due to rotation of the pulley, or by other means.

In a variable-speed unit such as described above, the adjustment means for varying the effective diameter of the variable-diameter pulley is usually provided with ball or roller bearings to make it as free-running as possible to prevent jamming or sticking of the pulley flanges. In practice it is usual to set the unit for a desired speed for some time, and due to the free-running bearings provided in the adjustment means, it is often difficult to maintain a desired adjustment and speed ratio, since the adjustment means has a tendency to creep during operation. Therefore, it is another object of our invention to supply such a unit with mechanism to maintain a desired adjustment, which we prefere to do by including a friction element in the control mechanism to prevent movement thereof during ordinary operation of the device.

A still further object of our invention is to supply a variable-speed unit as described above with a control mechanism which will prevent pinching of the belt between the flanges of the variable-diameter pulley when the pulley is not rotating. With the standard form of variable-speed unit, unskilled operators frequently attempt to change the effective diameter of the variable-diameter pulley when the device is not in operation, which often results in the belt becoming pinched or wedged between the pulley flanges, so that when operation of the device is commenced the belt will not ride free on the pulley, and breakage of parts results. This feature of our invention is designed to overcome this difficulty of operation, and is accomplished in its preferred form by providing a friction clutch mechanism in connection with the control device.

Another object of our invention is to provide openings in the housing of an enclosed variable-speed unit sufficiently large so that each of the pulley shafts and pulleys associated therewith may be inserted in or withdrawn from the housing in completely assembled relation without disturbing or dismantling the bearings for the shafts. Such a construction greatly facilitates assembly of the unit, since the pulleys may be assembled on their respective shafts outside the housing, and the shafts carrying the pulleys may then be inserted directly into the housing through the openings. Conversely, it facilitates repairs on the pulleys or shafts or replacement thereof, since they can readily be taken out of the housing.

In variable-speed units it is often desirable to have a wide speed change relation between the variable-diameter pulleys of the device, and it is accordingly another object of our invention to provide such a unit in which the pulleys are readily removable or interchangeable with pulleys of different sizes.

A still further object of our invention is to supply a variable-diameter pulley having two flange members, one of which is fixed to a drive shaft and the other of which is axially movable on the drive shaft, the movable flange member being keyed to the fixed flange member by a key on the movable flange member adapted to fit into a keyway in the fixed flange member, which keyway extends between the flanges. The advantage of such a construction lies in the fact that if the belt is allowed to move into contact with the shaft or hub on which the flanges are carried, it will not be damaged by a projecting key on the hub.

Another object of our invention is to provide in such a variable-speed unit a control member in the form of a rod that projects into the housing of the unit from one side thereof, being connected by appropriate mechanism to the variable-diameter pulleys of the device and effective to change the diameters thereof by rotation of the rod, there being means for rotating the rod from a position external to the housing, and the rod being readily interchangeable from a position adjacent one side of the housing to a position adjacent the other side of the housing. This feature is of particular utility in installations where it is desirable to have the control means on a particular side of the housing.

Still another object of our invention is to supply such a variable-speed unit with an indicating means for indicating on the exterior of the housing the relative speed ratio between the drive and driven shafts of the device. We prefer to operate such indicating means from the control rod of the device, and accordingly it is also an object of the invention to make the indicating means readily interchangeable from one side of the housing to the other with the control rod.

It is also an object of the invention to provide indicating means including a plate having a scale thereon and a pointer registering with the scale, the plate and pointer being adapted to be fixed in any one of a plurality of available positions relative to the transmission housing, so that regardless of the position of the housing the plate and scale may be conveniently accessible to the operator.

Another object of our invention is to provide a gear reduction unit in combination with a variable-speed device as described above which can be supported in a variety of positions.

A further object of our invention is to supply a variable-speed unit as described with a relatively small drive pulley and a relatively large driven pulley, so that when the drive pulley is adjusted to its maximum diameter and the driven pulley is adjusted to its minimum diameter, substantially a one-to-one ratio will exist between the pulleys, together with mechanism for varying the rate of change of the effective diameters of the pulleys at different rates to compensate for the difference in size of the two pulleys and to provide a greater speed variation between the pulleys than would otherwise be possible.

A still further object of the invention is to provide a lubricating attachment for an enclosed variable-speed pulley transmission, which may be positioned in any one of a plurality of positions relative to the transmission housing to insure accessibility thereto regardless of the position of the housing.

Other objects and advantages of our invention reside in the particular structures disclosed, as well as in the general combinations, which will be evident from the following description and claims.

Referring to the drawings, which are for the purpose of illustration only:

Fig. 2 is an elevational view of the embodiment shown in Fig. 1, slightly decreased in size.

Fig. 3 is a diagrammatic view of the form shown in Fig. 1, with the driven shaft extending vertically upward.

Fig. 4 is a diagrammatic view of the form shown in Fig. 1, with the driven shaft extending vertically downward.

Fig. 5 is a diagrammatic view of the positioning of the device shown in Fig. 3, with a double support.

Fig. 6 is an enlarged plan view of the indicating means of the invention.

Fig. 7 is an enlarged elevational view of Fig. 6.

Fig. 8 is an end view of Fig. 6, showing the indicating means on the housing and the control means of the device.

Fig. 10 is a diagrammatic view of the device shown in Fig. 9, showing an alternative form of support.

Fig. 11 is a sectional plan view of an alternative embodiment of our invention.

Fig. 12 is a sectional elevational view taken on the line 12—12 of Fig. 11, slightly decreased in size.

Fig. 13 is a sectional view taken on the line 13—13 of Fig. 12.

Fig. 14 is an enlarged view, partly in section, of the control rod shown in Fig. 13.

Fig. 15 is an enlarged perspective view of the friction ring shown in Fig. 14.

Fig. 16 is an alternative embodiment of our invention.

Figs. 17 and 17a are diagrammatic sectional views of the pulleys of our invention.

Fig. 18 is a sectional view of an alternative form of pulley means.

Figure 1:
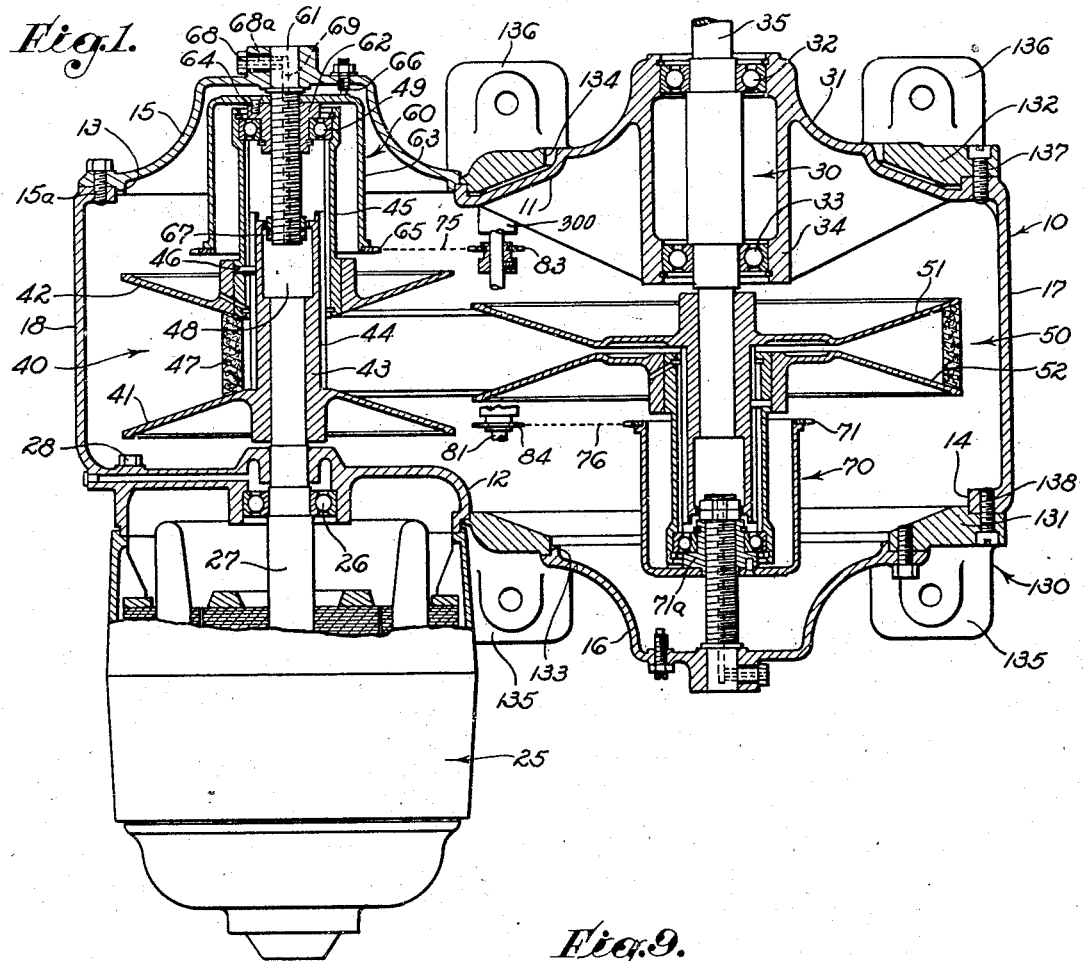
Fig. 1 is a plan view, partially in section, of one embodiment of our invention.

Referring to Figs. 1 to 8, we show one form of our invention in which the chief structural units of our device are generally designated for convenience as follows: a transmission housing 10; an electric motor 25; bearing means 30; a variable-diameter drive pulley means 40; a variable-diameter driven pulley means 50; drive pulley adjustment means 60; driven pulley adjustment means 70; control means 80; indicating means 110; and supporting means 130. It is to be understood that this enumeration is merely for convenience in description, and we do not intend to be limited thereby in any way to the general structural units so designated or combinations of such units.

The transmission housing 10 is provided with sides 11 and 12 having openings 13 and 14 therein respectively which are adapted to be closed by bell-shaped covers 15 and 16 secured to the sides of the housing by suitable bolts or other fastening means. The housing 10 also has ends 17 and 18, and has a top 19 and a bottom 20, there being rectangular openings 21 and 22 in the top and bottom respectively, adapted to be closed by cover plates 23 and 24 suitably secured to the housing. The cover plates 23 and 24 are interchangeable for a purpose to be described hereinafter in connection with the indicating means 110 of our invention.

As best shown in Fig. 1, the electric motor 25 is of the standard type, preferably a high speed motor, having the usual type of motor shaft bearings 26 journalling a drive shaft 27 which extends into the transmission housing 10, the motor being secured to the housing by any appropriate means such as bolts 28. The motor is normally fixed rigidly to the housing 10 and provides bearing means substantially fixed relative to the housing; or, if desired, the motor housing may be made integral with the transmission housing without departing from the spirit of our invention.

The bearing means 30 is provided in the transmission housing 10 opposite the opening 14, and preferably integral with the housing, being formed in an extending bell 31 formed on the side 11 of the housing. The bearing means 30 is comprised of an outer bearing 32 and an inner bearing 33, both of the bearings preferably being of the ball type having outer and inner races. The outer bearing 32 is retained in the bell 31, and the inner bearing 33 is retained on a cylindrical projection 34 formed integrally with the bell 31, the bearings being adapted to journal a driven shaft 35 which extends from a device to be driven (not shown) into the transmission housing 10. It is to be noted that the shaft 35 is wholly supported by the bearing means 30, and that the bearing means receives all of the rotational stresses and strains of the shaft 35, which is an important feature of our invention.

The variable-diameter drive pulley means 40 is carried on the drive shaft 27 of the motor 25 and is of the variable-diameter V-type having a fixed flange member 41 and an axially movable flange member 42. The fixed flange 41 is formed on a hub 43 which is suitably fixed rigid on the drive shaft 27, and the hub is provided with a keyway 44 extending the length thereof. Journalled on the hub 43 is a sleeve 45 to which the movable flange member 42 is fixed by appropriate means, and the sleeve carries a key 46 which projects into the keyway 44 in the hub to permit relative axial movement of the hub and sleeve but causing the hub and sleeve to rotate in unison with the drive shaft 27. Axial movement of the sleeve 42 relative to the hub 43 will cause a corresponding movement of the movable flange 42 relative to the fixed flange 41, and since the pulley means 40 is adapted to receive a resilient V-belt means 47 having a uniform width, such movement of the movable flange will vary the effective diameter of the pulley means, causing the belt to move on the flange members toward or away from the hub. The hub 43 and the end of the drive shaft 27 define a lubricant reservoir 48, the function of which will be described hereinafter. The outer end of the sleeve 45 is adapted to retain the outer race of a bearing 49 which is fixed thereto by suitable snap rings and which is preferably of the ball-bearing type.

The variable-diameter driven pulley means 50 is carried on the driven shaft 35 and is substantially similar to the pulley means 40 described in detail above, being of the variable-diameter V-type having a fixed flange 51 and an axially movable flange 52 which may be moved axially relative to the fixed flange as described in connection with the pulley means 40. It is to be noted, however, that the driven pulley 50 has a diameter considerably greater than the diameter of the drive pulley 40, the pulleys being proportioned so that when the drive pulley is adjusted to its maximum effective diameter and the driven pulley is adjusted to its minimum effective diameter, a substantially one-to-one gear ratio will exist between the pulleys. It is also clear from the drawings that a pulley of substantially the same size as the drive pulley 40 may be substituted for the driven pulley 50 on the driven shaft 35, to provide a pulley system in which the driven pulley may be rotated at a higher speed than the drive pulley.

The drive pulley adjustment means 60 is provided for varying the effective diameter of the pulley means 40, and has an externally threaded rod 61 slidably received in the bell-shaped cover 15 in axial alignment with the drive shaft 27. A riding element 62 is internally threaded on the rod 61 and is adapted to retain the inner race of the bearing 49 which is fixed thereto by a suitable snap ring, and a cup-shaped spider 63 is carried by the riding element, being fixed thereto by any convenient means such as the bolt 64. The inner end of the spider carries a sprocket 65, and rotation of the sprocket will cause a corresponding rotation of the spider 63 and the riding element 62. When the riding element 62 is rotated in a clockwise direction, the internal threads of the riding element will cooperate with the external threads on the rod 61 to cause the riding element to travel inwardly on the rod, and, conversely, a counterclockwise rotation of the riding element will cause it to travel outwardly on the rod. Any axial movement of the riding element is transmitted through the bearings 49 and the sleeve 45 to move the movable flange 42 axially relative to the fixed flange 41 to vary the effective diameter of the pulley 40. Outward movement of the spider 63 and riding element 62 is limited by an adjustable set screw 66 in the cover 15 which engages the spider, and inward movement of the riding element is limited by a lock nut 67 threaded on the inner end of the rod 61 which engages the riding element as it travels inwardly on the rod. The set screw 66 and the lock nut 67 may be adjusted as desired so as to limit the axial movement of the riding element 62, and constitute an adjustable stop means for preventing the bearing 49 from being overloaded by thrust transmitted by the riding element, which is an important feature of our invention.

A pin 68 is carried in the outer end of the rod 61 and has a central passage 68a communicating with the exterior of the housing 10 and with a longitudinal passage 69 in the rod. The passage 69 communicates with the lubricant reservoir 48, and lubricant, such as oil or grease, may be forced through the passages 68a and 69 into the reservoir, from whence it will work out between the engaging surfaces of the hub 43 and sleeve 45 and into the bearing 49 to lubricate the engaging movable parts. The pin 68 also locks the rod 61 relative to the cover 15. This feature of the invention provides means for lubricating the pulley means 40 and the adjustment means 60 while the pulley is rotating, and from a point external to the housing 10. The cover plate 15 is fastened to the housing by bolts 15a, and may be secured thereto in any one of a plurality of positions so as to provide the extending pin 68 in any position desired, which feature is important when the housing is mounted in upright position as described hereinafter.

The driven pulley adjustment means 70 is substantially like the drive pulley adjustment means 60 described above and is operative to move the movable flange 52 of the driven pulley 50 axially relative to the fixed flange 51 to vary the effective diameter of the driven pulley. A sprocket 71 and a riding element 71a are provided on the adjustment means 70 and are similar to like parts in the adjustment means 60.

It is to be noted that the openings 13 and 14 in the housing 10 are sufficiently large to permit the drive pulley 40 and the driven pulley 50 to be removed from the housing through their respective openings when the covers 15 and 16 are loosened, without removing or disturbing the drive shaft 27 or the driven shaft 35, or the bearings 26 or 30. This construction greatly facilitates assembly of the unit, since the pulleys may be assembled with their respective adjustment means out of the housing 10 and then inserted into the unit as a whole assembly. Likewise, the pulleys may readily be taken out of the unit for repairs, which obviates the disadvantages and inconveniences attendant on working on the unit after it has been completely assembled.

The control means 80 is provided to actuate the adjustment means 60 and 70 from the exterior of the transmission housing 10, as shown in detail in Figs. 6, 7, and 8, and includes a control rod 81 normally journalled in a bearing 82 in the side 11 of the housing, the bearing being formed adjacent the top 19 thereof. Sprockets 83 and 84 are suitably fixed to the control rod 81 in operative alignment with the sprockets 65 and 71 respectively on the adjustment means 60 and 70, being operatively connected therewith by chains 75 and 76. An externally threaded sleeve 87 detachably fixed on the control rod 81 by a set screw is normally threadedly received in an opening 88 in the side 12 of the housing. A collar 89 is also detachably fixed to the control rod 81 by a set screw and has an annular shoulder 90 adapted to engage a friction washer 91 formed of Bakelite or other appropriate material, the washer also engaging the hub of a hand wheel 92 which floats on the control rod. The hand wheel 92 is held in frictional engagement with the washer 91 by a spring washer 93 held thereagainst by a head element 94 suitably secured to the control rod 71. This construction permits the hand wheel 92, and its accompanying clutch and friction structure, to be fixed to either end of the control rod 81 as desired.

During the normal operation of the device, rotation of the hand wheel 92 will cause a corresponding rotation of the rod 81, but if the pulley mechanism or adjustment means becomes jammed or sticks for any reason so as to increase the force moment necessary to rotate the control rod, the friction clutch mechanism will cause the hand wheel to slip relative to the control rod, thus preventing rotation of the rod and possible consequent damage to the parts of the pulley structures. Another advantage of the control means 80 lies in the fact that the control rod 81 can only be rotated when the transmission is in operation. Unskilled operators frequently attempt to change the pulley ratios in the ordinary type of variable-speed transmission when the device is not operating, with a consequent pinching of the belt between the flanges of one of the variable-diameter pulleys, so that when the device is started, the belt will not ride free on the pulleys, and breakage of parts results. In our invention, the application of an additional force moment on the control wheel 92 sufficient to cause such pinching of the belt will cause the wheel to slip relative to the control rod 81, thus preventing actuation of the adjustment means 60 or 70 when the pulleys 40 and 50 are not rotating.

When the hand wheel 92 is rotated during normal operation of the device, the external threads on the sleeve 87 will cooperate with the internally threaded opening 88 in the housing 10 to cause the control rod to move axially, and the threads are so formed that the amount of movement of the control rod will be equal to the movement of the sprockets 65 and 71 of the adjustment means 60 and 70, so as to maintain the sprockets on the control rod in alignment with the sprockets on the adjustment means.

A bearing 300 similar to the bearing 82 and a threaded opening 301 similar to the opening 88 are also provided in the sides 11 and 12 of the housing 10 near the bottom 20 thereof, and are substantially the same distance from the drive and driven shafts 27 and 35 as the openings adjacent the top 19 of the housing described above. It is frequently desirable to have the hand wheel 92 of the control means 80 adjacent the bottom 20 of the housing 10, instead of in the position shown in Fig. 8, and by providing suitable openings therein to receive the control rod 81 and sleeve 87, the control means is readily interchangeable to either of the two positions. Since in either position the control rod is equidistant to the drive and driven shafts 27 and 35, the effective length of the chains 75 and 76 remains the same, and it is necessary only to change the direction of the chains when the rod is moved from one position to the other.

It is commonly known in the art that when a pair of variable-diameter pulleys having straight faced flanges are used and the pulleys are adjusted to the same effective diameters, the path of the belt connecting the pulleys will have a minimum length, and that if the diameter of one pulley is increased by an amount equal to a decrease in the diameter of the other pulley, the belt path will increase in length. This was a serious difficulty in variable-diameter pulley transmissions until the development of resilient belts. By making the belt 47 of sufficient resiliency, we obviate this difficulty in our device, the resiliency of the belt automatically taking up slack caused by the change in effective diameters of the pulley means.

In order to secure as great a speed variation as possible, we provide mechanism for decreasing the effective diameter of the drive pulley 40 more than the effective diameter of the driven pulley 50 is increased. Referring to Fig. 17, the numerals 95 and 96 indicate the position of the belt 47 between the flanges of the pulleys when the drive pulley 40 is adjusted to maximum effective diameter and the driven pulley 50 is adjusted to minimum effective diameter. It will be seen that adjustment of the drive pulley 40 to its maximum effective diameter 95 limits the minimum effective diameter 96 to which the driven pulley 50 may be adjusted. The numerals 97 and 98 indicate the position of the belt 47 in the flanges of the pulleys when the driven pulley 50 is adjusted to its maximum effective diameter and the drive pulley 40 is adjusted to its minimum effective diameter. If movable flanges of the pulleys 40 and 50 were moved at the same rate, the minimum effective diameter of the drive pulley could not be less than the diameter indicated by the dotted lines 99, since in such case the diameter of the drive pulley could not be decreased more than the diameter of the driven pulley is increased, and the maximum effective diameter of the driven pulley is limited to that indicated by the numeral 98 by the size of the driven pulley. It is, however, desirable to decrease farther the minimum effective diameter of the drive pulley 40 so as to obtain a greater gear ratio between the pulleys, and we accomplish this by moving the movable flange of the drive pulley at a faster rate than the movable flange of the driven pulley 50. By so moving the movable flange of the drive pulley, the maximum change in center distance 100 between the flanges of the drive pulley is substantially greater than the maximum change in center distance 101 between the flanges of the driven pulley 50, and the belt moves inwardly on the drive pulley from the position 95 to the position 97, and outward on the driven pulley from the position 96 to the position 98. There are several ways in which this operation can be accomplished with the apparatus set forth in Figs. 1 and 8. Thus, the movable flange 42 of the drive pulley 40 can be moved faster than the movable flange 52 of the driven pulley 50 by making the riding elements 62 and 71a threaded at slightly different pitches whereby a complete turn of the riding element 62 will cause a greater relative movement between the flanges 41 and 42 than would result between the flanges 51 and 52 when the riding element 71a is turned through a complete revolution. In the preferred embodiment, however, we prefer to accomplish this desired movement by means of the chain and sprocket system interconnecting the control rod 81 and the adjustment means 60 and 70. This may be done by suitably designing the number of teeth on the sprockets 65 and 83 with respect to the number of teeth on the sprockets 71 and 84. In the form shown, the sprocket 83 is slightly larger than the sprocket 84 so that the adjustment means 60 will be moved a greater degree than the adjustment means 70, to permit the drive pulley 40 to be adjusted to the minimum effective diameter shown in Fig. 1 and diagrammatically illustrated by the numeral 97 in Fig. 17.

The indicating means 110 is shown in detail in Figs. 6, 7, and 8, and is provided to indicate on the exterior of the housing the relative gear ratio between the pulleys 40 and 50. An indicator plate 111 is fixed to the cover plate 23 by suitable means such as screws 112, and has a scale 113 imprinted or otherwise fixed thereon. The screws 112 are so positioned that the indicator plate 111 may be fixed in any one of four positions relative to the cover plate 23 for a purpose to be described below. Extending through the cover plate 23 and the indicator plate 111 is a threaded stub shaft 114 threadedly receiving on its outer end a pointer 115 adapted to register with the scale 113, and having threadedly fixed on its inner end a lever element 116 connected through a pivot 117 to an actuating arm 118. The actuating arm 118 has a yoke 119 thereon which is adapted to ride on the control rod 81 in engagement with the sprocket element 84. A coil spring 120 is connected between a pin 121 on the cover plate 23 and the lever 116, and resiliently maintains the yoke 119 in engagement with the sprocket 84. When the control rod is rotated so as to move axially in the direction of the arrow 122, the sprocket 84 forces the yoke 119 and the lever 116 in the same direction to rotate the stub shaft 114 and the pointer 115 thereon to indicate the amount of axial movement of the control rod, and consequently to indicate the relative axial movement of the pulley flanges of the pulleys 40 and 50. When the control rod 81 is moved axially in the opposite direction, the spring 120 causes the yoke 119 to follow in engagement with the sprocket 84, and the pointer 115 also moves in the opposite direction over the scale 113. By loosening a lock nut 123 on the threaded stub shaft 114 and slightly unscrewing the shaft from the pointer 115 and the lever 116, the pointer may be rotated and fixed in any desired position on the shaft, so that if the indicator plate is reversed through 180° or other angle, the pointer may still be made to register with the scale 113, which may be desirable when the housing 10 is positioned upright as described below.

When the control rod 81 is changed from the position shown in Fig. 8 to its alternate position adjacent the bottom 20 of the housing, as described above, it may be desirable to interchange the cover plates 23 and 24 so as to provide the indicating means 110 on the bottom of the housing, and this is another useful feature of our invention.

The supporting means 130, as best shown in

Figs. 1 and 2, includes a pair of ring plates 131 and 132, having central openings 133 and 134 therein respectively, and foot members 135 and 136 respectively by which the unit is adapted to be fastened to a supporting structure. The ring plate 132 fits over the bell-shaped projection 31 of the housing 10 and is fastened to the housing by bolts 137 or other appropriate means, and the ring plate 131 partially closes the opening 14 in the housing and is similarly connected to the housing by bolts 138. The bolts 137 and 138 are so positioned that the ring plates 132 and 131 may be connected to the housing 10 with the feet 136 and 135 in any one of a plurality of positions relative to the housing, which is an important feature of our invention, since this construction permits the transmission unit to be mounted in a desired position relative to a device to be driven without providing a special auxiliary base construction.

The transmission housing 10 may be mounted with the feet 135 and 136 underneath and the housing in horizontal position, as shown in Fig. 2, or it may be mounted in any of the positions indicated by dotted lines 140 as desired. Although we provide eight each of bolts 138 and 137 fastening the ring plates 131 and 134, we do not intend to be limited thereto, since any desired number of such bolts may be used to provide more or less possible mounting positions without departing from the spirit of our invention. It is also to be noted that the ring plates can be mounted with the feet in any one of a plurality of positions so as to accommodate the unit to substantially any type of supporting mounting, whether the mounting be horizontal, vertical, or disposed at an angle.

It is frequently desirable to provide a reduction gear unit with the variable-speed unit described above, and in Fig. 9 we show such a combination. A transmission unit 140, which is substantially like the unit shown in Figs. 1 and 2, is provided with a reduction gear unit 141 of a standard type adapted to further reduce the speed of the driven shaft of the transmission unit, the gear unit being connected to the transmission unit by suitable fastening means 145 which take the place of the usual ring plate 142. The reduction gear unit 141 shown in Fig. 9 is of the so-called double-reduction type, and where such a gear unit is used, only one ring plate 142 is connected to the transmission housing on the opposite side from the gear unit, a second ring plate 143 being suitably connected directly to the gear unit.

An alternative form of supporting means is diagrammatically illustrated in Figs. 3, 4, and 5, which has particular utility where it is desirable to support a transmission unit, such as shown in Fig. 1, with the driven shaft in vertical position. The supporting means includes a ring plate 150 secured to a transmission housing 151, similarly to the ring plates shown in Fig. 1, and has extending legs 152 connected to or formed integrally with the ring plate 150 which are preferably rigidly secured to a base plate 153. The base plate 153 is adapted to be suitably secured to a supporting mounting, such as a portion of the machine to be driven. In the form shown in Fig. 3, the ring plate 150 is secured to the housing 151 on the same side as the motor so that the driven shaft 154 extends upwardly from the housing; in the form shown in Fig. 4, the ring plate 150 is secured to the housing 151 on the opposite side from the motor so that the driven shaft 154 extends downwardly; and in Fig. 5, similar ring plates 150 are secured to each side of the housing so that the unit may be supported from either above or below the housing with the drive shaft 154 extending upwardly. Obviously, the housing 151 may be suspended in the positions shown in Figs. 3 and 4 by attaching the ring plates 150 to the upper side of the housing without departing from our invention. It will also be clear that since the ring plates 150 are similar in construction to the ring plates 131 and 132 of Fig. 1, the housing 151 may be rotated around the driven shaft 154 to any one of a plurality of positions similar to the positions shown in Fig. 2 taken on a vertical axis.

Figure 9:
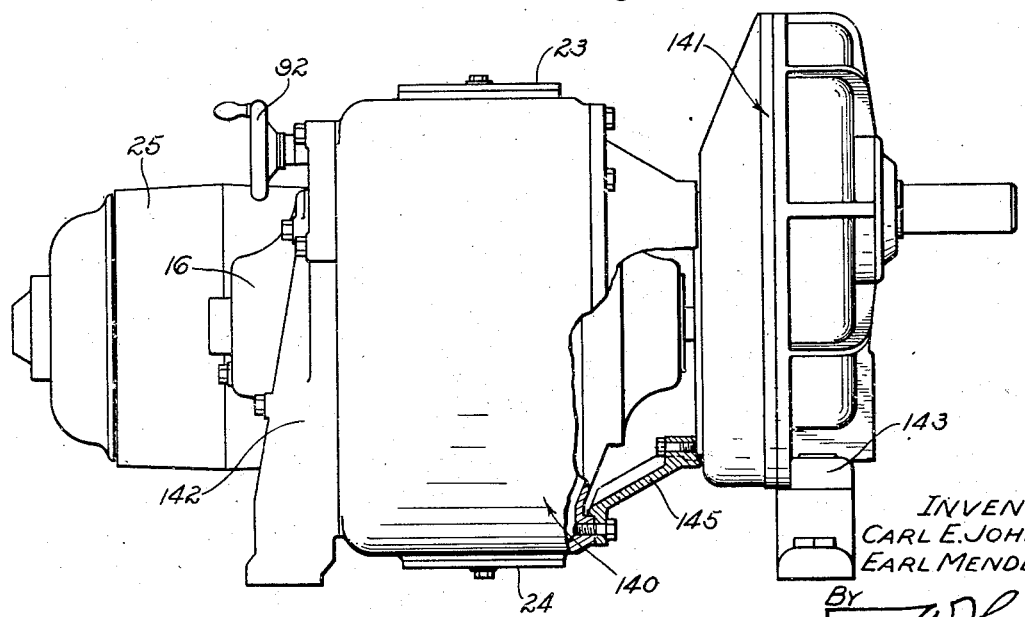
Fig. 9 is an end view of the unit shown in Fig. 1, with a reduction gear unit added.

In Fig. 10 we diagrammatically illustrate a transmission unit such as shown in Fig. 9, which may be provided with the supporting means described in connection with Fig. 3 to support it with the driven shaft in a plurality of vertical positions as described.

Referring particularly to Figs. 11 to 15, we show an alternative form of transmission unit which is similar in general construction to the unit shown in Fig. 1, but differs in several details thereof, and in which the chief structural units are generally designated as follows: a transmission housing 160; an electric motor 170; bearing means 180; a variable-diameter drive pulley means 190; a variable-diameter driven pulley means 200; drive pulley adjustment means 210; driven pulley adjustment means 220; and control means 230.

The transmission housing 160 has openings 161 and 162 in one side thereof which are normally closed by bell covers 163 and 164 fixed to the housing, and has openings 165 and 166 in the other side of the housing which are normally closed by the electric motor 170 and a bell cover 167 respectively. Feet 168 are provided integral with or suitably attached to the housing 160 to support it, and the housing has a covered opening 169 in the top thereof.

The electric motor 170, the drive pulley means 190, and the drive pulley adjustment means 210 are substantially similar to like members in Fig. 1, and will not be described in detail. The adjustment means 210, however, has a slightly different construction in that the threaded rod 211 on which its riding element travels is threaded into a cup-shaped element 212 which rests in a semi-spherical opening 213 in threaded member 214, to provide a ball-and-socket seat for the end of the rod 211. The member 214 is threadedly received in an opening 215 in the bell cover 163, and a lock nut 216 is threaded thereon to prevent the member 214 from rotating relative to the cover after it has been adjusted as desired. The rod 211 is held against rotation relative to the cover 163 by a lubricating tube 217 fixed therein and communicating through appropriate passages in the tube and rod with the interior of the drive pulley 190, to create a lubricating system similar in operation to that described in connection with Fig. 1. During operation of the device, the belt 218 connecting the drive and driven pulleys 190 and 200 frequently stretches due to wear, and the element 214 provides means for compensating for this belt stretch. When the element 214 is rotated in a clockwise direction, it will travel inwardly, forcing the adjustment means and consequently the movable flange of the drive pulley 190 inwardly to increase the effective diameter of the pulley and thereby take up any slack in the belt.

The opening 219 through which the tube 217 extends is elongated to permit the tube to move inwardly with the rod 211 but preventing rotation of the rod. The ball-and-socket joint formed by the cup-shaped element 212 and the member 214 permits the bearings of the adjustment means 210 to self-align during operation of the device.

The driven pulley means 200 is carried on a shaft supported by bearing means 180, which are similar to like parts shown in Fig. 1, and the driven pulley adjustment means 220 is similar to the drive pulley adjustment means 210. In this embodiment of the invention, however, the pulleys cannot be withdrawn from the housing 160 through any of the openings therein without dismantling the device.

The control means 230 includes a control rod 231 suitably journalled in openings 232 and 233 in the housing 160. The rod 231 has a sprocket 234 fixed thereon operatively connected by means of a chain 235 to the sprocket 219a on the adjustment means 210, and another sprocket 236 operatively connected by a chain 237 to the sprocket 221 on the adjustment means 220. One end of the rod 231 has an annular groove 238 formed therein adapted to receive the ends of friction pins 239 carried in openings 240 formed in a hub 241 of a hand wheel 242, the pins preferably being three in number inset at different points on the circumference of the hub and held in frictional engagement with the groove by an annular snap ring 243 bearing against the outer ends of the pins. A friction washer 244, shown in detail in Fig. 15, is carried on the other end of the rod 231 and is held in engagement against a boss 169a formed on the housing 160 by a collar 245 secured to the rod by a set screw 246. The hand wheel 242 and accompanying structure provide a friction clutch mechanism similar in operation and objects to that described in connection with Fig. 1, and the friction washer 244 prevents the rod 231 from creeping out of desired adjustment during operation of the transmission unit.

In Fig. 16 we show an alternative embodiment of our invention which is substantially similar to that shown in Fig. 11 except that the adjustment means and control means are of a slightly different construction from that shown in the preceding figures of the drawings. It has a transmission housing 250 which contains a drive pulley 251 and a driven pulley 252, and to which is connected an electric motor 253a. The drive pulley 251 has an adjustment means 253 which includes a rod 254 suitably fixed in a bell 255 of the housing 250 and carrying a riding element 256 in sliding relation thereon adapted to move axially the movable flange of the drive pulley 251 as described above in connection with the other forms of our invention. Threaded into the outer end of the riding element 256 are pins 257 and 258 slidably journalled in openings in the cover 255, and which are securely fastened to a riding plate 259. Pivoted to the riding plate 259 is a link 260 which is pivoted at its outer end to a lever 261. The lever 261 is also pivoted to a pivot link 262 at a point substantially at the center of the lever, the pivot link 262 being pivotally connected to an arm 263 formed integral with or rigidly secured to the cover 255. The opposite end of the lever 261 is pivoted to a control rod 264 which extends through the housing 250, being journalled therein by bearings 265 and 266. The opposite end of the rod 264 is pivotally connected to a lever arm 267, which is considerably longer than the lever 261 and has a handle 258 at its outer end. The lever arm 267 is pivotally connected through a pivot link 268a and a link 269 to the housing 250 and to a riding plate 270 of the adjustment means for the driven pulley 252, respectively. Although the pivot link 268a is pivoted to the lever arm 267 at a point substantially midway between the pivot of the rod 264 and the pivot of the link 269, the distance between such pivots is considerably less than the length of the lever 261.

When the handle 268 of the lever arm 267 is moved in the direction of the arrow 271, the lever arm will pivot on the pivot link 268a to drive the riding plate 270 inwardly in the same direction through the cooperation of the link 269, and to pull the control rod 264 in the opposite direction through the housing 250 so as to increase the effective diameter of the driven pulley 252. Such movement of the control rod 264 will cause the lever 261 to pivot on the pivot link 262 to pull the riding plate 259 and its associated riding element 256 outwardly so as to decrease the effective diameter of the drive pulley 251 and thereby to change the gear ratio between the pulleys. Conversely, movement of the handle 268 of the lever arm 267 in a direction opposite to that of the arrow 271 will produce a reverse movement of the riding plates 259 and 270. Due to the different effective lengths of the lever 261 and the lever arm 267, the riding plate 259 will be moved a greater distance than the riding plate 270, thereby providing means for varying the effective diameters of the pulleys at different rates for the same reasons as set forth above relative to Fig. 1.

In Fig. 18 we show an alternative form of pulley structure which may be substituted for the pulley structure shown in Fig. 1 if desired, and which provides multiple pulleys on both drive and driven shafts. This feature has particular utility where large transmission units capable of transmitting heavy power loads are required. In the drawings, a drive shaft 280 carries multiple drive pulley means 281, and a driven shaft 282 carries multiple driven pulley means 283. The drive pulley means 281 has a plurality of fixed flange members 284 formed on hubs 285 and being rigidly fixed to the drive shaft 280 by any suitable means such as set screws 286. A movable flange member 287 is slidably journalled on one of the hubs 285, and a movable flange member 288 having a sleeve 289 is slidably journalled on the drive shaft 280, each of the movable flanges cooperating with each of the opposed fixed flanges 284 to form variable-diameter pulleys of the V-type. The movable flanges 287 and 288 are rigidly connected together by means of one or more rods 290 passing through suitable openings 291 in the intermediate fixed flange 284, and appropriately fixed to the movable flanges. A key 292 formed on the sleeve 289 cooperates with a keyway 293 formed in the drive shaft 280 so as to prevent the movable flange members from rotating relative to the drive shaft but permitting axial movement thereof. The sleeve 289 is adapted to be moved axially by an appropriate adjustment means, such as the adjustment means 60 shown in Fig. 1, so as to vary the effective diameters of the pulleys constituting the pulley means 281 simultaneously. The driven pulley means 283 has substantially the same construction as the drive pulley means 281 and provides driven pulleys 294 and 295 operatively aligned with the drive pulleys and connected thereto by suitable belts 296 and 297. The driven pulleys 294 and 295, however, are of substantially greater maximum effective diameter than the drive pulleys, and the difference in pulley sizes has objects and operation similar to the pulleys shown in Fig. 1 and described in connection therewith. It is clear, of course, that any desired number of pulleys may be incorporated on each shaft in multiple relation without departing from the spirit of our invention.

Although we have illustrated several embodiments of our invention, each having a number of novel features, it is to be understood that we do not wish to be limited to the specific forms shown because various substitutions and interchanges of parts will be readily apparent to one skilled in the art from our disclosure.

We claim as our invention:

1. In a variable-speed device, the combination of: a shaft; a first pulley flange rigidly mounted on said shaft, said first pulley flange having a tubular hub extending beyond the end of said shaft to form a lubricant reservoir therein; a second pulley flange mounted on said tubular hub so as to be axially movable thereon, said second pulley flange having a cylindrical hub concentric with and surrounding said tubular hub; and a lubricating element extending through said hubs and into said reservoir, said element having a passage therethrough adapted to convey a lubricant into said lubricant reservoir during rotation of said pulley flanges.

2. In a variable-speed device, the combination of: a shaft; a first pulley flange rigidly mounted on said shaft, said first pulley flange having a tubular hub extending beyond the end of said shaft to form a lubricant reservoir therein; a second pulley flange mounted on said tubular hub so as to be axially movable thereon, said second pulley flange having a cylindrical hub concentric with and surrounding said tubular hub; a lubricating element extending through said hubs and into said reservoir, said element having a passage therethrough adapted to convey a lubricant into said lubricant reservoir during rotation of said pulley flanges; an adjustment means axially movable on said lubricating element and operatively connected to said cylindrical hub to adjust the axial position of said second pulley flange; and means for axially moving said adjustment means.

3. In a variable-speed device, the combination of: a shaft; a first pulley flange rigidly mounted on said shaft, said first pulley flange having a tubular hub extending beyond the end of said shaft to form a lubricant reservoir therein; a second pulley flange mounted on said tubular hub so as to be axially movable thereon, said second pulley flange having a cylindrical hub concentric with and surrounding said tubular hub; a lubricating element extending through said hubs and into said reservoir, said element having a passage therethrough adapted to convey a lubricant into said lubricant reservoir during rotation of said pulley flanges; an adjustment means axially movable on said lubricating element; thrust bearing means operatively connecting said adjustment means and said cylindrical hub, said lubricant reservoir communicating with said thrust bearing means; and means for axially moving said adjustment means so as to adjust the axial position of said second flange relative to said first flange.

4. In a variable-speed device, the combination of: an enclosed housing; a shaft extending into said housing from one side thereof; a first pulley flange rigidly mounted on said shaft, said first pulley flange having a tubular hub extending beyond the end of said shaft to form a lubricant reservoir therein; a second pulley flange axially movable on said tubular hub; an element extending into said housing and into said lubricant reservoir in axial alignment with said shaft from the opposite side of said housing, said element having a lubricant passage therethrough communicating between said lubricant reservoir and the exterior of said housing; adjustment means mounted on said element and operatively connected to said second pulley flange to axially move the same; and means for actuating said adjustment means to move axially said second pulley flange.

5. In a variable-speed device, the combination of: an enclosed housing; a shaft extending into said housing from one side thereof; a first pulley flange rigidly mounted on said shaft, said first pulley flange having a tubular hub extending beyond the end of said shaft to form a lubricant reservoir therein; a second pulley flange axially movable on said tubular hub; an externally threaded element extending into said housing and into said lubricant reservoir in axial alignment with said shaft from the opposite side of said housing, said element having a lubricant passage therethrough communicating between said lubricant reservoir and the exterior of said housing; adjustment means threadedly mounted on said element and operatively connected to said second pulley flange to axially move the same; and means for rotating said adjustment means to move it axially so as to adjust the axial position of said second pulley flange.

6. In a variable-speed device, the combination of: an enclosed housing; a shaft extending into said housing from one side thereof; a first pulley flange rigidly mounted on said shaft, said first pulley flange having a tubular hub extending beyond the end of said shaft to form a lubricant reservoir therein; a second pulley flange axially movable on said tubular hub; an externally threaded element extending into said housing and into said lubricant reservoir in axial alignment with said shaft from the opposite side of said housing, said element having a lubricant passage therethrough communicating between said lubricant reservoir and the exterior of said housing; adjustment means threadedly mounted on said element and operatively connected to said second pulley flange to axially move the same; means for rotating said adjustment means to move it axially so as to adjust the axial position of said second pulley flange; and stop means on said element for limiting the movement of said adjustment means.

7. In a variable-speed device, the combination of: an enclosed housing; a shaft extending into said housing from one side thereof; a variable-diameter pulley of the V-type on said shaft having a pair of flange members one of which is axially movable relative to the other; an externally threaded element extending into said housing from the opposite side thereof in alignment with said shaft; an adjustment member threadedly mounted on said element and operatively connected to said movable flange; and means for rotating said adjustment member to cause it to move axially to adjust the axial position of said movable flange.

8. In a variable-speed device, the combination of: an enclosed housing; a shaft extending into said housing from one side thereof; a variable-diameter pulley of the V-type on said shaft having a pair of flange members one of which is axially movable relative to the other; an externally threaded element extending into said housing from the opposite side thereof in alignment with said shaft; an adjustment member threadedly mounted on said element; thrust bearing means operatively connecting said member and said movable flange; and means for rotating said adjustment member to cause it to move axially to adjust the axial position of said movable flange.

9. In a variable-speed device, the combination of: a housing having a first opening therein and a second opening therein, said housing being provided with an engaging face adjacent each of said openings; a drive shaft in said housing; a driven shaft in said housing; a pulley on said drive shaft and a pulley on said driven shaft, one of said pulleys being of the variable-diameter V-type having a pair of flange members one of which is axially movable relative to the other to vary the effective diameter of said pulley; a belt operatively connecting said pulleys; adjustment means for axially moving said movable flange member to vary the effective diameter of said variable-diameter pulley; indicating means for indicating the relative speed ratio between said pulleys, said indicating means having an engaging plate adapted to engage either of said engaging faces on said housing; means for connecting said engaging plate to either of said engaging faces; and connecting means adapted to operatively connect said indicating means with said adjustment means when said engaging plate is in engagement with either of said engaging faces, so that said indicating means will indicate the relative speed ratio between said pulleys in either position of engagement of said plate.

10. In a variable-speed device, the combination of: a drive shaft; a driven shaft; frame means supporting said shafts; variable-speed transmission mechanism operatively connecting said shafts and adapted to change the speed relation between said shafts; adjustment means associated with said transmission mechanism for actuating the same to change the speed relation between said shafts; a control member; first supporting means associated with said frame means and adapted to support said control member in a first position relative to said transmission mechanism; second supporting means associated with said frame means and adapted to support said control member in a second position relative to said transmission mechanism; connecting means adapted to operatively connect said control member and said adjustment means when said control rod is in either said first or second position; and means for moving said control member, whereby said adjustment means is actuated thereby through said connecting means to change the speed relation between said shafts.

11. In a variable-speed device, the combination of: a housing having a first opening therein and a second opening therein, said housing being provided with an engaging face adjacent each of said openings; a drive shaft in said housing; a driven shaft in said housing; variable-speed transmission mechanism operatively connecting said shafts and adapted to change the speed relation between said shafts; indicating means for indicating the relative speed ratio between said shafts, said indicating means having an engaging plate adapted to engage either of said engaging faces on said housing; means for connecting said engaging plate to either of said engaging faces; adjustment means associated with said transmission mechanism for actuating the same to change the speed relation between said shafts; connecting means adapted to operatively connect said indicating means with said adjustment means when said engaging plate is in engagement with either of said engaging faces so that said indicating means will indicate the relative speed ratio between said pulleys in either position of engagement of said plate.

CARL E. JOHNSON.
EARL MENDENHALL.